United States Patent [19]
Romano

[11] Patent Number: 5,337,861
[45] Date of Patent: Aug. 16, 1994

[54] BACK PEDAL BRAKE FOR DERAILLEUR BICYCLE

[76] Inventor: Anthony Romano, 6941 Jackson Dr., San Diego, Calif. 92119

[21] Appl. No.: 78,345

[22] Filed: Jun. 21, 1993

Related U.S. Application Data

[63] Continuation-in-part of Ser. No. 33,511, Feb. 16, 1993, abandoned.

[51] Int. Cl.$^5$ ............................ B62L 1/06; B62L 5/00
[52] U.S. Cl. .................... 188/24.17; 192/5; 280/261
[58] Field of Search ............ 280/261; 188/24.17; 192/5, 6 R

[56] References Cited

U.S. PATENT DOCUMENTS

| | | | |
|---|---|---|---|
| 3,888,334 | 6/1975 | Mack | 188/24.17 |
| 3,966,229 | 6/1976 | Foster | 188/24.17 |
| 4,030,774 | 6/1977 | Foster | 188/24.17 |
| 4,134,481 | 1/1979 | Calderazzo | 188/24.17 |
| 4,261,449 | 4/1981 | Foster | 192/5 |

FOREIGN PATENT DOCUMENTS 3235226  3/1984  Fed. Rep. of Germany ... 188/24.17

Primary Examiner—Mitchell J. Hill
Attorney, Agent, or Firm—Ralph Branscomb

[57] ABSTRACT

A pedal actuated brake system is provided for retrofitting onto a multi-speed bicycle so that back pedaling applies the brakes. A decoupler disengages the front chain sprocket from the crank when reverse-rotated to prevent application of the brakes when the bike backs up. The system may be used in addition to or in place of the existing hand brakes.

7 Claims, 3 Drawing Sheets

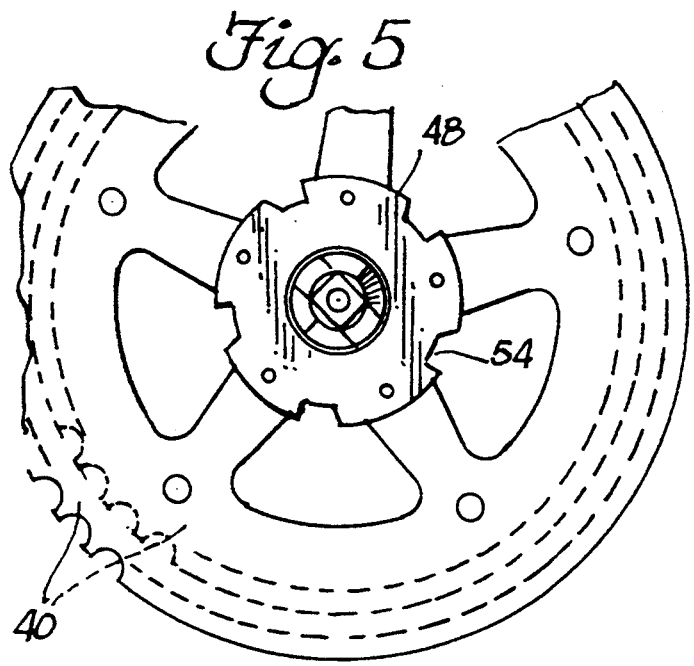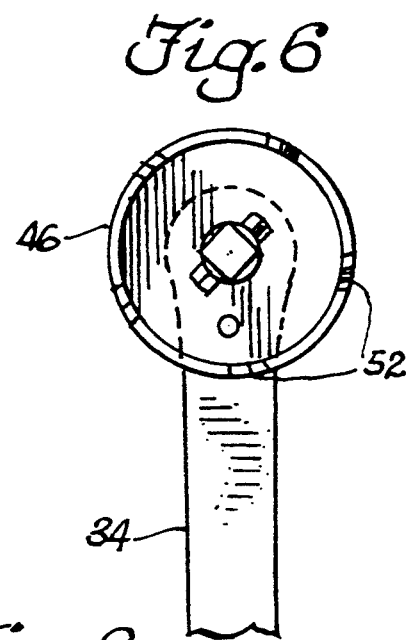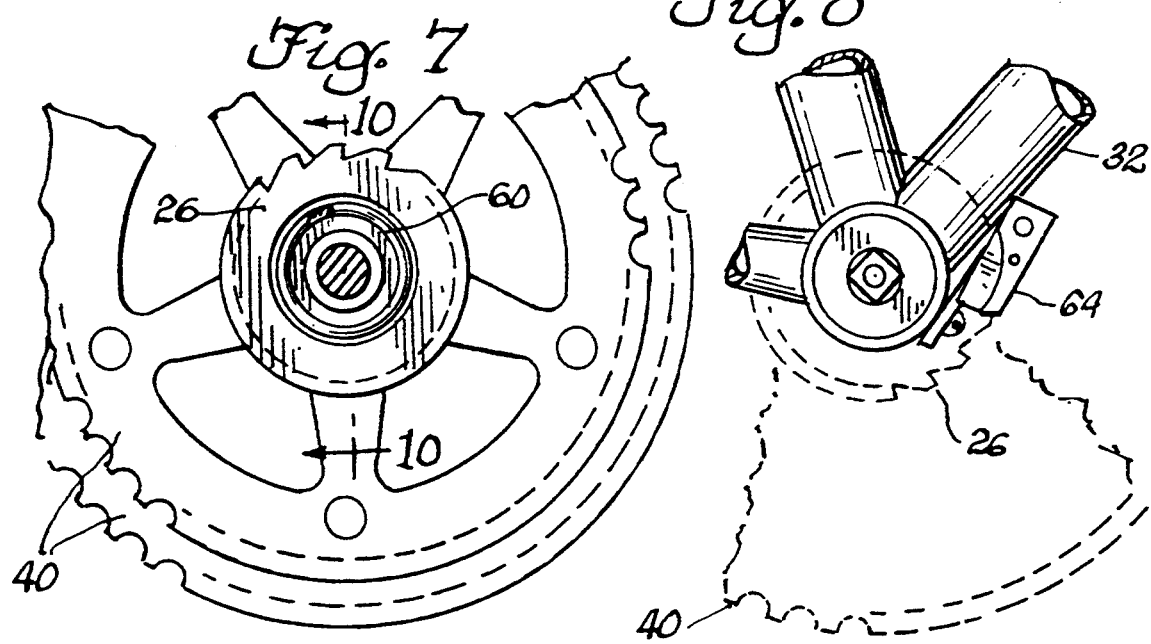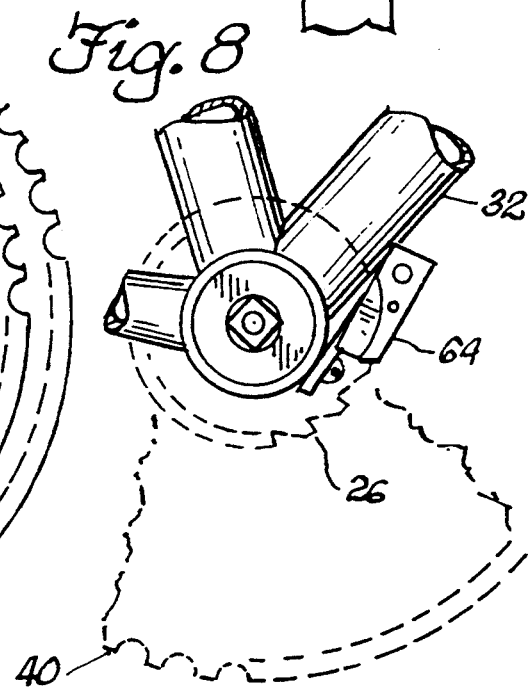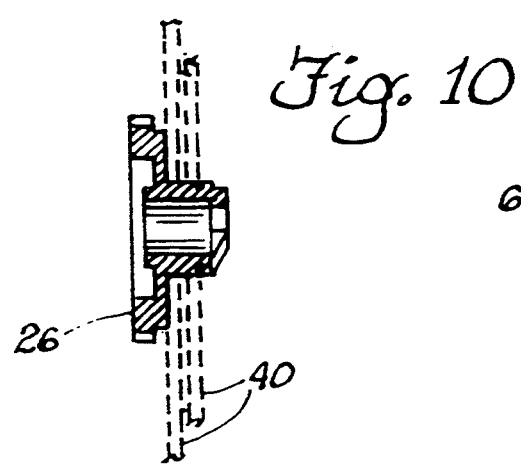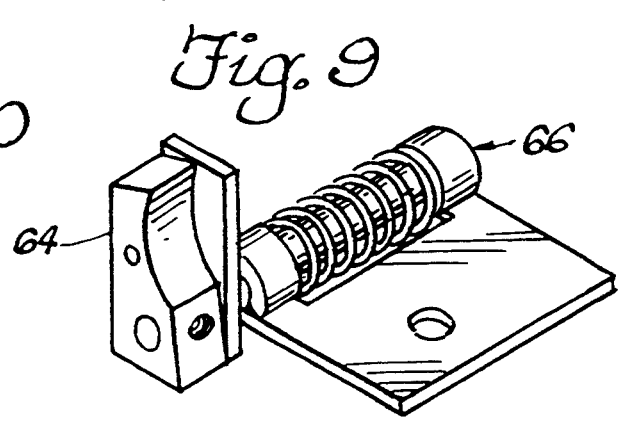

BACK PEDAL BRAKE FOR DERAILLEUR BICYCLE

This is a continuation-in-part of application No. 08/033,511 filed Feb. 16, 1993, now abandoned.

BACKGROUND OF THE INVENTION

Early bicycles had pedal cranks directly mounted to the front wheel. The mechanical advantage the rider had was established by the ratio of the crank diameter to the wheel diameter, resulting in the production of bicycles with dangerously large wheels to achieve high speeds. However, in the simplest case braking was ever so simple, as the rider could just reverse the direction of pedal force.

The innovation of the chain drive enabled the wheels to be made much smaller and safer by decoupling mechanical advantage from rider altitude. By the early part of this century, mass-produced, chain-driven one-speed bicycles dominated all other styles. Brakes were housed in the rear wheel hub and actuated upon reverse-pedalling.

The next drive train advance was the three-speed bicycle. A thumb-operated shift lever typically shifted the gears in the rear hub-mounted gear box, overcoming the severe speed and climb limits inherent in one-speeders. Braking could still be incorporated into the rear hub and actuated by backpedalling. The "three-speed" represented the last word in production line bicycles for a few years, until the "ten speed", with its multiple-gear-sprocket derailleur, came on the scene.

The so-called "ten speed", with its two front and five rear gear rings, has become generic to multi-gear derailleur-type street bicycles, regardless of the number of "speeds" available. Once the multiple-gear sprocket hurdle had been passed, the number of commonly offered gear ratios proliferated into the 20's.

By the time of the advent of the multi-speed derailleur bicycles, chain drive had become universal. Single-speed bicycles had a chain that was an unvarying, set length, which need not change throughout the operation of the bicycle. This was also true of the three-speed, which used a shift mechanism which did not involve jumping the chain from ring-to-ring. Since both the upper and lower chain runs of the chain loop were always reasonably taut, braking could be accomplished through backpedalling, coupling the backpedalling action to a mechanism internal to the rear wheel hub.

The derailleur system, on the other hand, requires that the chain vary in effective length. This was accommodated by incorporating a spring-loaded idler sprocket in the lower chain run, with the forward-motion tension being applied through the upper run. The idler in a typical multi-speed bicycle can take up to about twelve inches of chain slack.

The old single-speed bicycle brake could be actuated by backpedalling, as minimal slack in the lower chain run made for good braking repose time. With the advent of the derailleur however and the idler pulley with its accompanying twelve inches of chain slack, brakes could no longer be applied by reversing chain direction, practically speaking. By the time the ten to twelve inches of slack had been taken out of the lower chain run, a bicyclist could have plowed into the side of a truck. Hand brakes were thus used and touted as an advance in bicycle brakes, which no doubt they were, since braking force is applied to both wheels instead of just one, and to the periphery of the wheel rather than the hub.

It is inherent in the handbrake system that at least one, and more likely both, of the hands must be maintained in brake-ready position, which is often uncomfortable and awkward. For this reason there are those who think of the reverse-pedal bicycle brake with nostalgia. Of course, the best of both worlds would be to have both hand brakes and foot brakes available, permitting riding in a wider variety of postures, eliminating the necessity of maintaining oneself in the awkward, crouched-over position, while maintaining maximum stopping power. A bi-modal bicycle braking system to accomplish this would be welcomed in the bicycle community.

SUMMARY OF THE INVENTION

The instant invention supplies the need set forth above, providing a braking system which can be retrofitted on an existing bike, or built into an OEM product. The braking system utilizes a ratchet on the pedal crank which actuates when the pedals are reverse-rotated, pulling the brake cables. The cables either connect directly to the brakes, or connect to the existing brake cables to tension them independently of the hand brakes. The brakes are actuated by reverse-pedalling, but not through the chain to the rear wheel, so that the amount of slack in the lower chain run is immaterial.

Although basically simple, there is a complication inherent in the design of derailleur bikes beyond the idler gear in the lower run when it comes to pedal-actuated braking. This is the fact that if the pedals are configured to apply the brakes when reverse-rotated, the brakes will apply every time the bicycle backs up. Because bicyclists routinely back up, this problem would constitute a nuisance at the very least, and at worst could cause serious accidents.

To overcome this, the invention utilizes a clutch mechanism releasingly coupling the front crank sprocket to the crank shaft. The sprocket is freewheeling on the crank shaft (that is, when not engaged by the chain or clutch), and captured axially between an outer clutch plate mounted to the pedal crank and an inner decoupler plate mounted on the sprocket. The decoupler plate has an annular row of apertures which are engaged by suitably corresponding sawteeth of the clutch plate for a positive drive in the forward motion direction. The clutch has adequate axial play on the crank to space itself away from the sprocket with the sawteeth completely disengaged from the clutch plate, but the decoupler is spring-biased outwardly against the clutch plate so that ordinarily the sprocket is securely captured therebetween, with the sawteeth engaged in the apertures and positively driving the sprocket.

When the pedals are reversed however, a decoupling ratchet wheel mounted to the sprocket is engaged by a pawl mounted on the crank hub of the frame so that the sprocket cannot reverse-rotate. The clutch plate and the sprocket butt against each other through a pair of mating, helical ramps. As the two rotate in opposite directions from one another during reverse pedalling because the sprocket is locked by the pawl, the ramps ramp up, separating the clutch from the decoupler plate until the sawteeth clear the apertures and the sprocket is freewheeling. This will work the same whether the sprocket is driven by reverse-rotation of the rear wheel, or by backpedalling. This simple system automatically effectuates decoupling of the front sprocket and makes the reverse-pedal brake possible.

BRIEF DESCRIPTION OF THE DRAWINGS

FIG. 5 is a partially fragmentary section taken along line 5—5 of FIG. 11;

FIG. 6 is a section taken through the drive shaft at line 6—6 of FIG. 11 illustrating the mounting of the clutch plate to the drive shaft and crank;

FIG. 7 is a section taken through the drive shaft along line 7—7 of FIG. 11, similar to FIG. 6 but illustrating the outline of the decoupling ratchet wheel mounted on the sprocket;

FIG. 8 is a side elevation view of a fragmentary hub detail illustrating the sprocket decoupling pawl on the side opposite from that of FIG. 7;

FIG. 9 is a perspective view of the pawl and mounting mechanism;

FIG. 10 is a section taken along line 10—10 of FIG. 7;

DETAILED DESCRIPTION OF THE PREFERRED EMBODIMENT

The invention itself is primarily a pedal brake actuator incorporated into existing brake designs. The existing brakes are used but actuated through the pedals in lieu of or in tandem with existing handgrip actuators.

Figure 1:
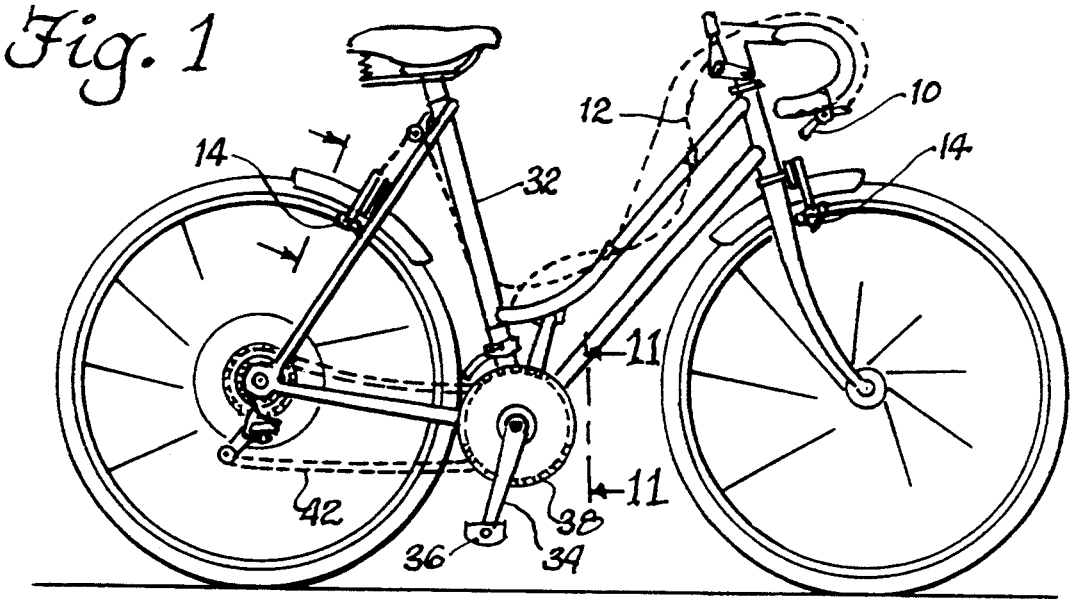
FIG. 1 is a side elevation view of a bicycle illustrating the general arrangement of the parts and the brakes.
Figure 2:
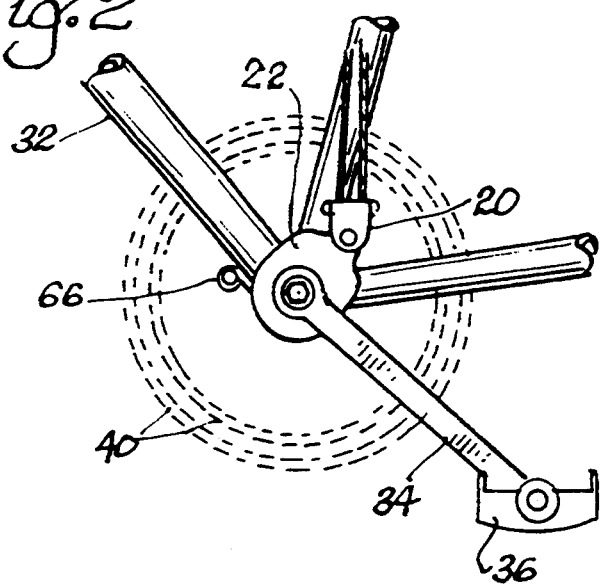
FIG. 2 is a side elevation view of a fragmentary portion of a frame and crank surrounding the crank shaft journal.
Figure 4:
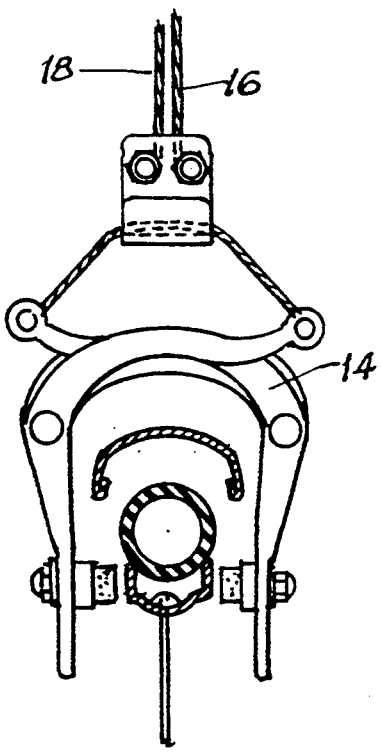
FIG. 4 is a transverse section taken along line 4—4 of FIG. 1.

A typical multi-speed bicycle is shown in FIG. 1, with the conventional handgrip brake arrangement. The actuators are indicated at 10, with the cables being shown in dotted line at 12 going to the respective brake calipers 14. The bowden wire cables have a flexible outer sheath which is axially incompressible. A caliper is shown on the rear wheel in FIG. 4, with the hand brake cable 16 engaging the cable yoke of the caliper. As shown in FIG. 4, the end of the hand brake cable is free of its sheath, which terminates in a fixedly mounted sleeve, not shown, a few inches away from the termination of the cable. The similarly configured foot brake cable 18 forming part of the invention is shown parallel to the hand brake cable in FIG. 4.

Figure 14:
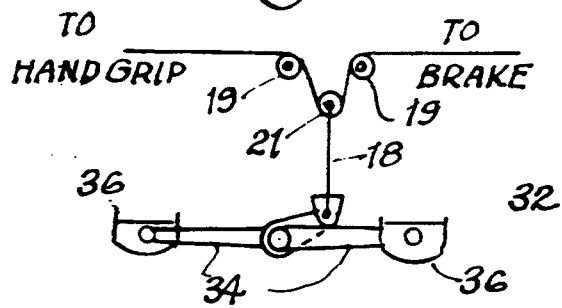

As an alternative to the parallel mounting of the foot brake cable and the hand brake cable shown in FIG. 4, the foot brake cable could be connected to an exposed portion of the inner cable wire of the hand brake cable and arranged to deflect it laterally, to exert a tug on the brake substantially independently from the axial pull of the hand brake actuator itself. This arrangement would have the advantage of avoiding temporary slack in the hand brake cable when the foot brake cable is applied, and vice versa. One implementation of this concept is shown in FIG. 14, in which a length of the handbrake cable is diverted around a pair of pulleys 19 by the foot brake cable 18 which terminates in the idler pulley 21.

The front brake caliper is identical to the rear brake caliper except for mounting details. The mounting as shown in FIG. 4 is for the dual actuator system wherein the brake can be actuated either by hand or by foot, or by both. Also, one of the brake systems, i.e., hand or foot, could be applied to the front wheel only, and act as an emergency brake. This would ordinarily be the foot brake, so that if the rider is caught with his hands up in the air or holding a package or otherwise indisposed, he could reverse-pedal quickly as an emergency stop measure.

In any event, aside from the overall configuration considerations, the actual foot brake actuator requires no modification from one system to the other. The foot brake actuator cable 18 extends from the cable yoke of the caliper as shown (or from its attachment to the hand brake cable as shown in FIG. 14) along the frame to the bail 20 of the direction-sensitive actuator element 22. In the preferred embodiment this actuator 22 is a pawl and ratchet ring enclosed in the housing 24, best shown in FIG. 11. Although there are a number of ways of effecting the reverse-actuator result, the simple configuration of the preferred embodiment utilizes the free-floating ratchet mechanism 22 which glides in idle mode on the crank shaft 28, which is itself journalled in the crank hub 30, an integral part of the bicycle frame 32.

In the illustrated embodiment, the freewheeling ratchet 22 is held generally in place by the tension of the two footbrake cables 18, absent which it would rotate. When the crank is reversed, the internal mechanism of the ratchet causes it to positively engage the shaft, rotating the ratchet unit with it, applying an increasing tension on the cables 18, which are of course connected to the front and rear brakes as described above and as shown in FIG. 4.

This portion of the apparatus is straightforward. Any direction-sensitive actuator producing the results of the one shown would work. However, were the modifications to stop here, the brakes would apply every time the bicycle were backed up. Derailleurs have a freewheel mechanism incorporated into the rear sprocket mount so that when the bicycle is rolling forward, which is described herein as "clockwise" to describe a rotational direction corresponding to the linear forward motion, the pedals idle rather than being driven forwardly. The freewheel of course cannot be effective in preventing the reverse-rotating wheel from driving the front sprocket, as this is the same motion that is required to propel the bike by driving the crank clockwise. Without some means of circumventing the reverse-motion/braking effect, the invention would be of limited utility inasmuch as the convenience of an additional braking mode would most likely be outweighed by the resulting inconvenience and hazard of unexpected braking action.

Figure 11:
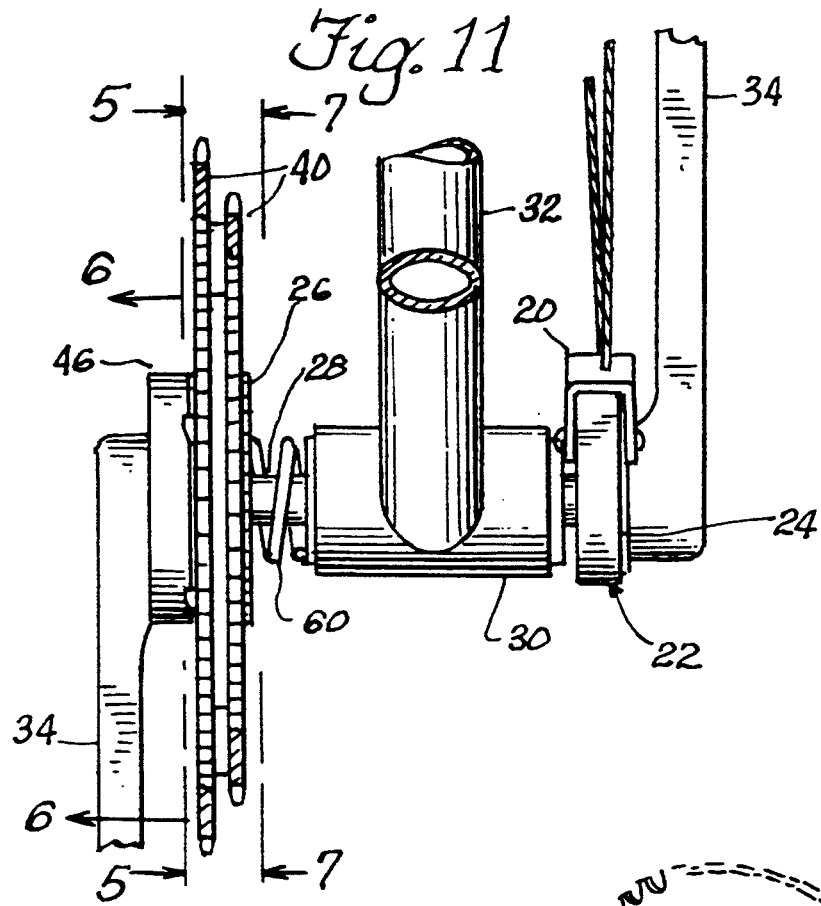
FIG. 11 is a front view of the pedal crank hub partially in section taken along line 11—11 of FIG. 1.
Figure 13:
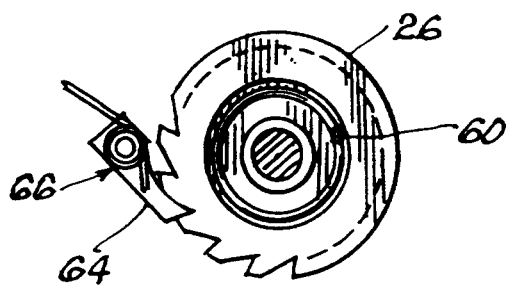
FIG. 13 is a side elevation view illustrating the action of the pawl on the reverse-rotation decoupling ratchet; and, FIG. 14 is a diagrammatic illustration of a dual handbrake/footbrake system in which the footbrake deflects the cable of the handbrake to actuate the brake caliper.
Figure 12:
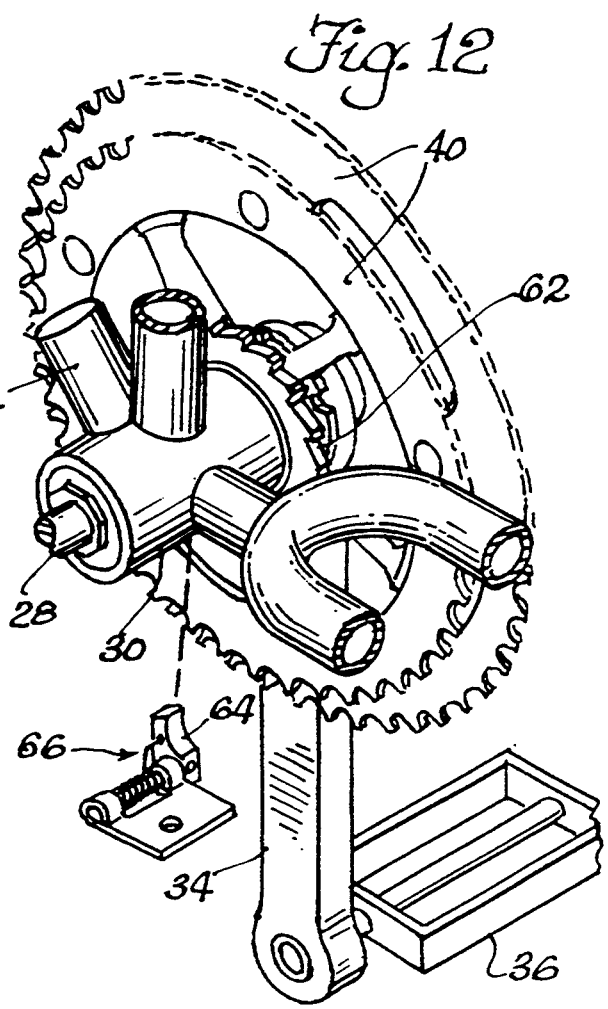
FIG. 12 is a perspective view of the sprocket and clutch mechanism illustrating the decoupling pawl exploded from the underside of the hub casing.

The mechanism used to overcome the reverse braking effect is thus illustrated in FIGS. 11-13 of the third sheet of drawings. In these figures, the crank hub 30 is shown journalling the shaft 28 and mounting the crank 34 which terminates in the swivel-mounted pedals 36. The front sprocket 38, which is comprised of a combination of parallel gear elements 40 spaced apart to permit chain clearance, freewheels on the shaft absent the restraining forces of the chain 42 connected to the rear sprocket or the clutch mechanism 44. In other words, the sprocket is not rigidly or non-rotationally mounted to the shaft or the crank. It is not really a freewheel either, as it is always under the restraint of either the rear sprocket through the chain, or the crank shaft through the clutch mechanism.

The clutch comprises a clutch plate 46, which in the illustrated embodiment is integral with the crank mechanism. The clutch interfaces with a decoupling plate 48 on which the sprocket is journalled. One of these plates has a circular row of directional sawteeth 52, and the other plate has a series of mating apertures 54 such that when the plates are engaging one another, that is they are pressed together axially, the crank, through the clutch, drives the sprocket. In the embodiment shown the teeth are on the clutch plate, with the apertures being defined in the decoupling plate.

As long as forward (clockwise) force is provided through he crank, the radially oriented front edges 56 of the sawteeth positively engage the corresponding surfaces of the apertures 54 in the mating plate for a seamless drive. The sprocket is pressed up against the clutch as shown in FIG. 11 by the coil spring 60. Although this spring must be reasonably strong, it does not overcome any axial forces derivative from the sprocket drive so that overcoming friction is adequate.

Figure 3:
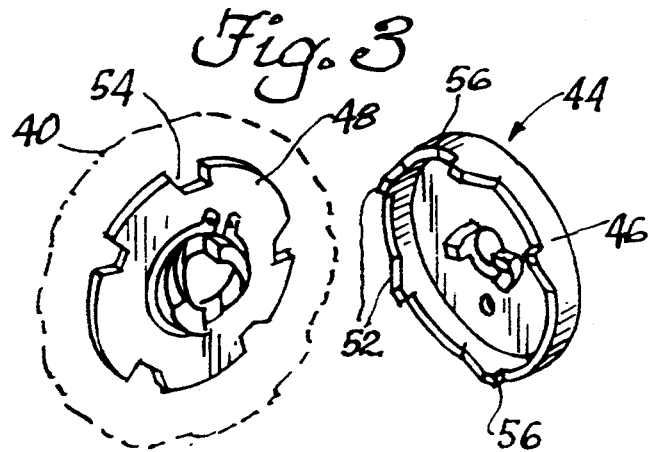
FIG. 3 is an exploded perspective view illustrating the clutch plate and the mating decoupler plate.

Because of the direction of the sawteeth, they could operate between the clutch and mating plates as a ratchet. In other words, the teeth could ride up out of the apertures in one direction so that a unidirectional action would be achieved without further structure. However, for a cleaner freewheeling effect, the clutch plate is progressively spaced from the decoupler plate by the two semi-cylindrical spacers having helical ramps as best shown in FIG. 3. These two segments mate flushly together to form a fully engaged sprocket and crank assembly as shown in FIG. 11, under action of the coil spring 60. However, if the pedal assembly tries to backpedal relative to the decoupler plate since the decoupler cannot reverse-rotate, the helical ramps will ride up on one another causing the two plates to separate, disengaging the sprocket by axially separating the two plates beyond the point at which the teeth engage the apertures.

This separation only occurs in the illustrated embodiment if the sprocket is prevented from counter clockwise rotation. Because of the freewheel on the rear sprocket, without further structure a typical multi-speed arrangement would permit the front sprocket and crank to freewheel in the counter clockwise direction. To prevent this, a ratchet wheel 62 is mounted on the inside of the sprocket, and cooperates with a pawl 64, with its spring-loaded mounting assembly 66 shown in FIG. 9, which is mounted to the bicycle frame at the crank hub. As shown in FIGS. 8–10, as well as 12 and 13, cooperation of this structure is such that it is never possible for the sprocket to rotate counter clockwise.

The invention comprises several assemblies acting in concert, each of which could be engineered a different way than as shown herein. Three one-way mechanisms are used in the dual-brake bicycle shown: the rear freewheel (standard), the foot brake cable actuator ratchet, and the sprocket-to-crankshaft clutch/decoupler. Each of these subsystems has as its functional bottom line unidirectional action. Many different implementations of these functions would serve to enable the invention, which as set forth in the appended claims comprises a foot brake actuator system using a direction-sensitive brake cable actuator and a sprocket decoupler, however constituted, to achieve a tandem or replacement pedal brake for a bicycle already having a substantially standard cable-actuated caliper brake system.

It is hereby claimed:

1. For a bicycle having:
   (i) a frame defining a pedal crank mount;
   (ii) a front wheel and a rear wheel journalled in said frame;
   (iii) a pedal crank assembly having a crank shaft journalled in said pedal crank mount;
   (iv) a front sprocket mounted on said pedal crank assembly;
   (v) a rear sprocket mounted on said rear wheel and being operatively connected to said front sprocket by means of a chain such that pedal crank rotation in one rotational direction moves the bicycle forward and said one rotational direction is defined as the clockwise direction;
   (vi) a cable-operable caliper brake for at least one of said wheels actuated by pulling on a cable connected to said caliper brake,
   a pedal brake actuator comprising:
   (a) a foot brake cable for engaging said caliper brake;
   (b) a direction-sensitive actuator operatively engaged between said pedal crank assembly and said cable to pull said cable when said crank is rotated counter-clockwise and to freewheel when said crank rotates clockwise;
   (c) a sprocket release mechanism operative between said front sprocket and said pedal crank assembly to disengage said front sprocket from said pedal crank when said crank is rotated in the counter-clockwise direction; and,
   (d) said sprocket release mechanism comprising a clutch assembly, and said front sprocket being freewheelingly engaged on said crank shaft, and said clutch assembly defining a one-way drive interface between said shaft and said front sprocket such that clockwise pedalling drives said front sprocket through said clutch, and counter-clockwise pedalling permits freewheeling of said front sprocket relative to said clutch assembly.

2. Structure according to claim 1 wherein said bicycle has a hand brake actuator and said cable-operable brake is connected to said hand brake actuator through a hand brake cable, and said foot brake cable engages said hand brake cable to deflect said hand brake cable laterally to tension said hand brake cable and actuate said caliper brake substantially independently of any axial tensioning motion exerted by said hand brake actuator.

3. Structure according to claim 2 wherein said cable-operable caliper brake is duplicated to provide two hand caliper brakes to engage said front and rear wheels, respectively, each of said caliper brakes having a hand brake cable and said foot brake cable engages both the hand brake cables of the respective cable-operable brakes.

4. Structure according to claim 1 wherein said cable-operable brake comprises a caliper brake for use with a hand brake actuator and having an actuator cable re-routed to said direction-sensitive actuator such that said pedal brake actuator replaces said hand brake actuator.

5. Structure according to claim 1 wherein said direction-sensitive actuator is a ratchet mechanism engaged on the shaft of said pedal crank assembly and freewheels when said crank rotates in the clockwise direction.

6. Structure according to claim 1 wherein said clutch assembly comprises a clutch plate mounted orthogonally on said shaft and a decoupling plate mounted on said sprocket and engaged against said clutch plate, there being a plurality of angulated saw teeth extending from one of said plates and a plurality of apertures on the other said plates, said apertures being positioned and dimensioned to overfit said saw teeth when said plates are interfaced, such that said saw teeth engage said apertures when said plates are mutually rotated in one direction, and disengage said apertures when mutually rotated in the opposite direction, such that said interface slips when said crank assembly is cranked counter-clockwise and said saw teeth engage in said mating apertures and drive said front sprocket when said pedal crank assembly is pedalled in the clockwise direction.

7. Structure according to claim 6 wherein said plates define mutually axially abutting spacers defining mating helical ramps such that clockwise rotation of said crank relative to said sprocket brings said plates into maximal contact by ramping down said spacers, and rotation of said crank in the counter-clockwise direction causes said spacers to mutually ramp up and space said plates apart to disengage said sprocket from said crank.

* * * * *